United States Patent [19]
Denzinger et al.

[11] Patent Number: 6,060,566
[45] Date of Patent: May 9, 2000

[54] GRAFT POLYMERS OF POLYMERS CONTAINING VINYL ESTER AND/OR VINYL ALCOHOL UNITS AND ETHYLENICALLY UNSATURATED COMPOUNDS, THEIR PREPARATION AND THEIR USE

[75] Inventors: Walter Denzinger, Speyer; Martin Rübenacker, Altrip; Claudia Nilz, Rödersheim-Gronau; Primoz Lorencak, Ludwigshafen; Dietmar Mönch, Weinheim; Rudolf Schuhmacher, Böhl-Iggelheim; Andreas Stange, Mannheim, all of Germany

[73] Assignee: BASF Aktiengesellschaft, Ludwigshafen, Germany

[21] Appl. No.: 08/983,141

[22] PCT Filed: Jul. 9, 1996

[86] PCT No.: PCT/EP96/02991

§ 371 Date: Jan. 21, 1998

§ 102(e) Date: Jan. 21, 1998

[87] PCT Pub. No.: WO97/04014

PCT Pub. Date: Feb. 6, 1997

[30] Foreign Application Priority Data

Jul. 21, 1995 [DE] Germany .......................... 195 26 626

[51] Int. Cl.⁷ ........................ C08F 283/06; C08F 263/04; C08L 51/04
[52] U.S. Cl. ........................ 525/455; 525/459; 525/328.2; 525/305; 525/307; 525/308; 524/504; 524/563; 526/303.1
[58] Field of Search ..................... 525/455, 459, 525/328.2, 305, 307, 308; 524/504, 563; 526/303.1

[56] References Cited

U.S. PATENT DOCUMENTS

| | | |
|---|---|---|
| 4,880,497 | 11/1989 | Pfohl et al. . |
| 4,978,427 | 12/1990 | Pfohl et al. . |
| 5,334,287 | 8/1994 | Hartmann et al. . |
| 5,591,799 | 1/1997 | Bott et al. ............................ 525/328.2 |

FOREIGN PATENT DOCUMENTS

| | | |
|---|---|---|
| 0 363 319 | 4/1990 | European Pat. Off. . |
| 0 617 166 | 9/1994 | European Pat. Off. . |
| 40 30 358 | 4/1992 | Germany . |
| WO 95 32227 | 11/1995 | WIPO . |

OTHER PUBLICATIONS

Database WPI Week 9431, Derwent Publications Ltd., London, GB; AN 94–252866.

*Primary Examiner*—James J. Seidleck
*Assistant Examiner*—Olga Asinovsky
*Attorney, Agent, or Firm*—Oblon, Spivak, McClelland, Maier & Neustadt, P.C.

[57] ABSTRACT

Graft polymers are obtainable by free radical polymerization of (A) monomers or monomer mixtures comprising (a) from 1 to 100% by weight of N-vinylcarboxamides of the formula

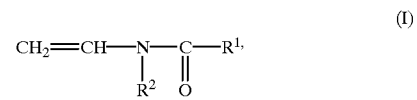

where $R^1$ and $R^2$ are each H or $C_1$–$C_6$-alkyl, (b) from 0 to 99% by weight of other monoethylenically unsaturated monomers copolymerizable with the monomers (a) and (c) from 0 to 5% by weight of monomers having at least two ethylenically unsaturated, nonconjugated double bonds in the molecule, in the presence of (B) polymers which contain units of vinyl esters of saturated $C_1$–$C_4$-carboxylic acids and/or vinyl alcohol units, or of mixtures which contain these polymers and polymers having at least 3 alkylene oxide units or polytetrahydrofuran, in a weight ratio (A):(B) of from 95:5 to 10:90 and, if required, subsequent elimination of the group

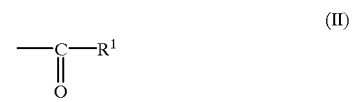

from the polymerized monomers (I) of the graft polymer with formation of units of the formula

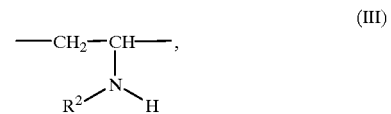

and the graft polymers described above are used in the production of paper, board and cardboard as dry and wet strength agents, as retention and drainage aids and as promoters in diketene sizing and as starch cationization agents, as dispersants for pigments and as creping assistants in the production of tissue papers.

10 Claims, No Drawings

GRAFT POLYMERS OF POLYMERS CONTAINING VINYL ESTER AND/OR VINYL ALCOHOL UNITS AND ETHYLENICALLY UNSATURATED COMPOUNDS, THEIR PREPARATION AND THEIR USE

Graft polymers of polymers containing vinyl ester and/or vinyl alcohol units and ethylenically unsaturated compounds, their preparation and their use.

BACKGROUND OF THE INVENTION

1. Field of the Invention

The present invention relates to graft polymers of polymers containing vinyl ester and/or vinyl alcohol units and open-chain N-vinylcarboxamides, processes for their preparation and their use in the production of paper, board and cardboard, as dispersants for pigments and as starch cationization agents.

2. Description of the Background

U.S. Pat. No. 4,880,497 and U.S. Pat. No. 4,978,427 each disclose the production of paper having high dry strength and wet strength, a hydrolyzed copolymer obtainable by copolymerization of N-vinylformamide and ethylenically unsaturated monomers, such as vinyl acetate, vinyl propionate or an alkyl vinyl ether, and hydrolysis of from 30 to 100 mol % of the formyl groups of the copolymer with formation of amino groups being used as a strength agent either on the surface of the paper or in the paper stock prior to sheet formation. The hydrolyzed copolymers are used in amounts of from 0.1 to 5% by weight, based on dry fibers.

EP-A-0 363 319 discloses graft polymers which are obtainable by free radical polymerization of unsubstituted or N-substituted acrylamide or methacrylamide and N-vinyl-substituted amides or vinyl esters of a saturated aliphatic monocarboxylic acid in the presence of adducts of alkylene oxides with a trihydric or polyhydric aliphatic alcohol of 3 to 10 carbon atoms. The graft polymers are used for coloring cellulosic fibers with substantive dyes or reactive dyes as colorants.

U.S. Pat. No. 5,334,287 discloses graft polymers which are obtainable by free radical polymerization of N-vinylcarboxamides, preferably N-vinylformamide, and, if required, other monomers in the presence of monosaccharides, oligosaccharides, polysaccharides or the derivatives thereof in each case and, if required, hydrolysis of the polymerized N-vinylcarboxamido group with formation of vinylamine units. The graft polymers are used as dry and wet strength agents in the production of paper, board and cardboard.

The earlier non-prior-published German Application 19515943.8 relates to graft polymers which are obtainable by free radical polymerization of
(A) monomers or monomer mixtures comprising
  (a) from 10 to 100% by weight of N-vinylcarboxamides of the formula

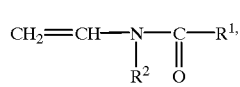
(I)

where $R^1$ and $R^2$ are each H or $C_1$–$C_6$-alkyl,
  (b) from 0 to 90% by weight of other monoethylenically unsaturated monomers copolymerizable with the monomers (a) and
  (c) from 0 to 5% by weight of monomers having at least two ethylenically unsaturated, nonconjugated double bonds in the molecule,
in the presence of
(B) polymers which contain at least 3 units of a $C_2$–$C_4$-alkylene oxide, and/or polytetrahydrofuran in a weight ratio (A):(B) of from 95:5 to 10:90, and subsequent elimination of some or all of the groups

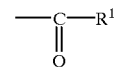

from the polymerized monomers (a) of the graft polymer with formation of units of the formula

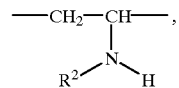

processes for the preparation of the graft polymers and the use of the graft polymers in papermaking as dry and wet strength agents, as fixing agents for interfering substances and dyes, as retention and drainage aids and as promoters in diketene sizing. The graft polymers are furthermore used as starch cationization agents and as dispersants for pigments.

SUMMARY OF THE INVENTION

It is an object of the present invention to provide novel substances. It is a further object of the present invention to provide process assistants for the production of paper, board and cardboard.

We have found that this object is achieved, according to the invention, by graft polymers of polymers containing vinyl ester and/or vinyl alcohol units and ethylenically unsaturated compounds, wherein the graft polymers are obtainable by free radical polymerization of
(A) monomers or monomer mixtures comprising
  (a) from 1 to 100% by weight of N-vinylcarboxamides of the formula

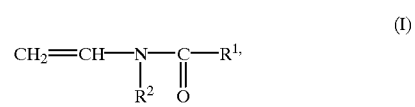
(I)

where $R^1$ and $R^2$ are each H or $C_1$–$C_6$-alkyl,
  (b) from 0 to 99% by weight of other monoethylenically unsaturated monomers copolymerizable with the monomers (a) and
  (c) from 0 to 5% by weight of monomers having at least two ethylenically unsaturated, nonconjugated double bonds in the molecule,
in the presence of
(B) polymers which contain units of vinyl esters of saturated $C_1$–$C_4$-carboxylic acids and/or vinyl alcohol units, or of mixtures which contain these polymers and polymers having at least 3 alkylene oxide units or polytetrahydrofuran
in a weight ratio (A):(B) of from 95:5 to 10:90 and, if required, subsequent elimination of the group

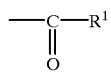 (II)

from the polymerized monomers (a) of the graft polymer with formation of units of the formula

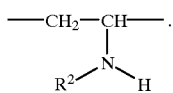 (III)

The present invention furthermore relates to a process for the preparation of graft polymers from polymers containing vinyl ester and/or vinyl alcohol units and ethylenically unsaturated compounds, wherein
(A) monomers or monomer mixtures comprising
  (a) from 1 to 100% by weight of N-vinylcarboxamides of the formula

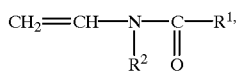 (I)

where $R^1$ and $R^2$ are each H or $C_1$–$C_6$-alkyl,
  (b) from 0 to 90% by weight of other carboxyl-free monoethylenically unsaturated monomers copolymerizable with the monomers (a) and
  (c) from 0 to 5% by weight of monomers having at least two ethylenically unsaturated, nonconjugated double bonds in the molecule
are subjected to free radical polymerization in the presence of
(B) polymers which contain units of vinyl esters of saturated $C_1$–$C_4$-carboxylic acids and/or vinyl alcohol units, or of mixtures which contain these polymers and polymers having at least 3 alkylene oxide units or polytetrahydrofuran,
in a weight ratio (A):(B) of from 95:5 to 10:90, and, if required, some or all of the groups

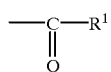 (II)

are then eliminated from the polymerized monomers (a) of the graft polymer with formation of units of the formula

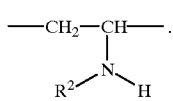 (III)

The present invention also relates to the use of the graft polymers described above in the production of paper, board and cardboard as dry and wet strength agents, as retention and drainage aids and as promoters in diketene sizing and as starch cationization agents, as dispersants for pigments and as creping assistants in the production of tissue paper.

DETAILED DESCRIPTION OF THE INVENTION

A preferably used monomer (A) is N-vinylformamide. In a further process step, from 2 to 100, preferably from 30 to 95, % of the formyl groups of the polymerized N-vinylformamide are eliminated from the graft polymers thus obtainable, with formation of units of the formula

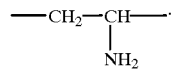 (IV)

Preferably used monomer mixtures consist of from 1 to 99% by weight of N-vinylformamide and from 99 to 1% by weight of vinyl formate, vinyl acetate, vinyl propionate, acrylonitrile, N-vinylpyrrolidone, N-vinylcaprolactam, acrylic acid or mixtures of the stated monomers. From 1 to 100, preferably from 30 to 95, % of the formyl groups of the polymerized N-vinylformamide are eliminated from the graft polymers thus obtainable. Depending on the hydrolysis conditions, it is also possible chemically to modify the polymerized comonomers, for example vinyl alcohol units are formed from the polymerized vinyl esters.

Suitable monomers of group (a) for the preparation of the graft polymers are N-vinylcarboxamides of the formula

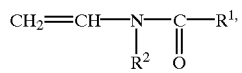 (I)

where $R^1$ and $R^2$ may be identical or different and are each hydrogen or $C_1$–$C_6$-alkyl. Examples of suitable monomers are N-vinylformamide ($R^1$=$R^2$=H in the formula I), N-vinyl-N-methylformamide, N-vinylacetamide, N-vinyl-N-methylacetamide, N-vinyl-N-ethylacetamide, N-vinyl-N-methylpropionamide and N-vinylpropionamide. For the preparation of the graft polymers, the stated monomers may be used either alone or as a mixture with one another. N-vinylformamide is preferably used from this group of monomers.

The abovementioned N-vinylcarboxamides can, if required, be used, in the graft polymerization, with other monoethylenically unsaturated monomers copolymerizable therewith. Examples of suitable monomers of group (b) are vinyl esters of saturated carboxylic acids of 1 to 6 carbon atoms, eg. vinyl formate, vinyl acetate, vinyl propionate and vinyl butyrate. Esters, amides and nitriles of monoethylenically unsaturated $C_3$–$C_6$-carboxylic acids are also suitable. Suitable amides are, for example, acrylamide, methacrylamide and N-alkylmonoamides and N-alkyldiamides, where the alkyl radical in each case is of 1 to 6 carbon atoms, eg. N-methylacrylamide, N,N-dimethylacrylamide, N-methylmethacrylamide, N-ethylacrylamide, N-propylacrylamide and N-tert-butylacrylamide, and the basic (meth)acrylamides thereof, eg. dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide. The esters of the monoethylenically unsaturated carboxylic acids with $C_1$–$C_6$-alcohols, eg. methyl acrylate, methyl methacrylate, ethyl acrylate and ethyl methacrylate, or with glycols or polyglycols, where in each case only one OH group of the glycols and polyglycols is esterified with an ethylenically unsaturated carboxylic acid, eg. hydroxyethyl acrylate, hydroxyethyl methacrylate, hydroxypropyl acrylates, hydroxybutyl acrylates, hydroxypropyl methacrylates, hydroxybutyl methacrylates and the monoesters of acrylic acid with polyalkylene glycols having a molecular weight of from 1500 to 10,000 are also suitable. The esters of ethylenically unsaturated carboxylic acids with amino alcohols, eg. dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminopropyl methacrylate, dimethylaminobutyl acrylate, diethylaminobutyl acrylate, dimethylaminopentyl acrylate, dimethylaminoneopentyl methacrylate and dimethylaminohexyl acrylate, are furthermore suitable. The basic acrylates and acrylamides are used in the form of the free bases, in the form of the salts with mineral acids, eg. hydrochloric acid or sulfuric acid and nitric acid, or in quaternized form. Examples of suitable quaternizing agents are dimethyl sulfate, methyl chloride, ethyl chloride, benzyl chloride and diethyl sulfate. Monoethylenically unsaturated mono- and dicarboxylic acids or anhydrides of 3 to 6 carbon atoms, eg. acrylic acid, methacrylic acid, crotonic acid, maleic acid or anhydride, fumaric acid, itaconic acid or anhydride and citraconic acid or anhydride, are also suitable.

Other suitable monomers of group (b) are N-vinylpyrrolidone, N-vinylcaprolactam, acrylonitrile, methacrylonitrile, N-vinylimidazole and substituted N-vinylimidazoles, eg. N-vinyl-2-methylimidazole, N-vinyl-4-methylimidazole, N-vinyl-5-methylimidazole and N-vinyl-2-ethylimidazole, and N-vinylimidazolines, such as N-vinylimidazoline, N-vinyl-2-methylimidazoline and N-vinyl-2-ethylimidazoline. N-vinylimidazoles and N-vinylimidazolines are used not only in the form of the free bases but also in a form neutralized with mineral acids or in quaternized form, quaternization being effected preferably with dimethyl sulfate, diethyl sulfate, benzyl chloride, methyl chloride or ethyl chloride.

Other suitable monomers (b) are sulfo-containing monomers, for example vinylsulfonic acid, allylsulfonic acid, methallylsulfonic acid, styrenesulfonic acid, 3-sulfopropyl acrylate, 3-sulfopropyl methacryate and 2-acrylamido-2-methylpropanesulfonic acid. The compounds having acid groups can be used in the graft polymerization in the form of the free acids or of the ammonium, alkali metal and alkaline earth metal salts. Of the monomers (b), vinyl formate, vinyl acetate, vinyl propionate, acrylonitrile, N-vinylpyrrolidone, N-vinylcaprolactam and acrylic acid are preferred.

In the preparation of the graft polymers, monomer mixtures comprising from 1 to 100% by weight of at least one monomer of group (a) and from 0 to 99% by weight of at least one monomer of group (b) are used.

The graft copolymers can be modified by copolymerizing the monomers (a) or monomer mixtures comprising (a) and (b) with up to 5% by weight of a monomer (c) having at least two ethylenically unsaturated, nonconjugated double bonds in the molecule, in the presence of the compounds (B). The compounds (c) are usually used as crosslinking agents in copolymerizations. They may be added to the monomer mixtures of (a) and, if required, (b) used for the copolymerization. Where they are employed, the preferably used amount is from 0.05 to 2% by weight. The presence of the monomers of group (c) during the copolymerization results in an increase in the molecular weights of the copolymers. Suitable compounds of this type are, for example, methylenebisacrylamide, esters of acrylic acid and methacrylic acid with polyhydric alcohols, eg. glycol diacrylate, glyceryl triacrylate, glycol dimethacrylate and glyceryl trimethacrylate, and polyols which are at least diesterified with acrylic or methacrylic acid, such as pentaerythritol and glucose. Other suitable crosslinking agents are divinylbenzene, divinyldioxane, pentaerythrityl triallyl ether and pentaallylsucrose. Water-soluble monomers, such as glycol diacrylate or glycol diacrylates of polyethylene glycols having a molecular weight of up to 3000, are preferably used from this group of compounds.

The polymerization of the monomers (a) and that of the monomers (a) and (b) and, if required, in each case additionally (c) is carried out according to the invention in the presence of (B) polymers which contain units of vinyl esters of saturated $C_1$–$C_4$-carboxylic acids and/or vinyl alcohol units. Such polymers are known. They are prepared, for example, by polymerization of vinyl esters of saturated $C_1$–$C_4$-carboxylic acids, such as vinyl formate, vinyl acetate, vinyl propionate, vinyl n-butyrate, vinyl isobutyrate or mixtures of the stated vinyl esters in the presence of compounds which form free radicals. Polymers containing vinyl alcohol units are formed therefrom by partial or complete hydrolysis of the polymers thus obtainable, for example by the action of aqueous sodium hydroxide solution or potassium hydroxide solution on the polymers.

Other suitable grafting bases (B) in addition to the above-mentioned polymers are copolymers of the vinyl esters of saturated $C_1$–$C_4$-carboxylic acids with other, monoethylenically unsaturated monomers which are copolymerizable with the vinyl esters. These copolymers preferably contain at least 20% by weight of at least one vinyl ester as polymerized units. Examples of suitable comonomers are N-vinylpyrrolidone, N-vinylcaprolactam, maleic anhydride, maleic acid, acrylic acid, methacrylic acid, N-vinylformamide, styrene, vinyl butyl ether, vinyl ethyl ether, vinyl chloride, butyl acrylate, ethylhexyl acrylate, acrylonitrile, N-vinylcarbazole, isobutene and/or methyl methacrylate. In the case of the copolymerization of the vinyl esters, it is also possible to use mixtures of two or more comonomers; for example, vinyl acetate can be copolymerized with N-vinylpyrrolidone and N-vinylformamide. Suitable components (B) are also polymer blends which contain (1) the polymers described above and containing vinyl ester and/or vinyl alcohol units and
(2) polymers having at least 3 alkylene oxide units or polytetrahydrofuran.

Polymers containing alkylene oxide units and polytetrahydrofurans are known. Of particular interest are the homo- and copolymers of $C_2$–$C_4$-alkylene oxides. They are prepared, for example, by homo- or copolymerization of ethylene oxide, propylene oxide, n-butylene oxide and/or isobutylene oxide. The copolymers can be either random copolymers, if mixtures of at least 2 alkylene oxides are polymerized, or block copolymers, if an alkylene oxide, for example ethylene oxide, is first polymerized and another alkylene oxide, eg. propylene oxide, is then polymerized. The block copolymers may be assigned, for example, to the AB, ABA or BAB type, where A is, for example, a polyethylene oxide block and B is a block comprising polypropylene oxide. These copolymers can, if required, also contain n-butylene oxide and/or isobutylene oxide as polymerized units. The polyethylene oxides contain at least 3 alkylene oxide units in the molecule. The polyalkylene oxides may contain, for example, up to 50,000 alkylene oxide units in the molecule. Preferred polyalkylene oxides are those which have from 3 to 1000 alkylene oxide units in the molecule. The polytetrahydrofurans contain, for example, from 3 to 200, preferably from 3 to 100, tetramethylene oxide units.

Preferably used compounds are homopolymers or block copolymers of ethylene oxide and propylene oxide and random copolymers of ethylene oxide and propylene oxide, which are obtainable by copolymerizing a mixed gas comprising ethylene oxide and propylene oxide. For the purposes of the present invention, polymers containing alkylene oxide units are also understood as meaning adducts of $C_2$–$C_4$-alkylene oxides with alcohols, phenols, carboxylic acids and amines.

Alcohols which are suitable for the reaction with the alkylene oxides are of, for example, 1 to 30 carbon atoms, eg. methanol, ethanol, n-propanol, isopropanol, n-butanol, n-octanol, 2-ethylhexanol, decanol, dodecanol, palmityl alcohol, cetyl alcohol and stearyl alcohol. Of particular industrial interest are the alcohols obtainable by the oxo process, for example $C_{10}$-alcohols, $C_{13}$ oxo alcohols or natural alcohols, such as $C_{10}$/$C_{18}$-tallow fatty alcohols.

In addition to the stated monohydric alcohols, it is of course also possible to use dihydric and polyhydric alcohols for initiating the polymerization of the alkylene oxides, eg. glycol, glycerol, erythritol, pentaerythritol and sorbitol. The alcohols are reacted with at least one $C_2$–$C_4$-alkylene oxide in a molar ratio of from 1:3 to 1:200.

Further suitable polymers containing alkylene oxide units are reaction products of fatty acids with alkylene oxides. Particularly suitable fatty acids are those which contain 8 to 10 carbon atoms in the molecule, for example lauric acid, myristic acid, stearic acid, palmitic acid, coconut fatty acid, tallow fatty acid and oleic acid.

For the purposes of the present invention, polymers containing ethylene oxide units are also the adducts of $C_2$–$C_4$-alkylene oxides with $C_1$–$C_{12}$-alkylphenols, such as n-decylphenol, n-octylphenol, isobutylphenol and methylphenol. Other suitable components (B) for the preparation of the graft polymers are the adducts of $C_2$–$C_4$-alkylene oxides with secondary $C_2$–$C_{30}$-amines, such as di-n-butylamine, di-n-octylamine, dimethylamine and distearylamine. The molar ratio of amine to at least one alkylene oxide is from 1:3 to 1:200, preferably from 1:3 to 1:100. In the case of the adducts of alkylene oxides with alcohols, phenols, acids or amines, the alkylene oxides may be subjected in the form of a mixed gas to the addition reaction with the abovementioned compounds, or the reaction is carried out first with ethylene oxide and then with propylene oxide. It is also possible to subject first propylene oxide and then ethylene oxide to the addition reaction with the stated compounds. Apart from ethylene oxide and propylene oxide, it is also possible, if required, to subject isobutylene oxide and/or n-butylene oxide to the addition reaction. Block copolymers are formed in the successive addition of the alkylene oxides. In some cases, it may also be advantageous to block the free OH groups of the alkoxylation products with a terminal group. Blocking with terminal groups can be effected, for example, by means of an alkyl radical with formation of an ether group. For example, the alkoxylation products can be reacted with alkylating agents, such as dimethyl sulfate. The terminal OH groups can, if required, also be esterified by reaction with carboxylic acids, eg. acetic acid or stearic acid.

Preferably used grafting bases (B) are polyvinyl formate, polyvinyl acetate and polymers which are obtainable therefrom by hydrolysis and, in the case of partial hydrolysis, have vinyl alcohol units in addition to unchanged vinyl ester units. In the case of complete hydrolysis of the polyvinyl esters, polyvinyl alcohol is obtained. Particularly preferred grafting bases are those hydrolyzed polyvinyl formates and/or polyvinyl acetates which contain at least 50 mol % of vinyl alcohol units.

The molecular weight of the polymers which are suitable as component (B) is preferably from 1000 to 1 million. The polymers preferably used as grafting base are water-soluble or water-dispersible.

For the preparation of the graft polymers, the monomers of component (A), ie. (a), mixtures of (a) and (b) and, if required, in each case additionally (c), are subjected to free radical polymerization in the presence of polymers of component (B). In some cases, it may be advantageous with regard to the action of the resulting polymer if two or more of the compounds stated under (B) are used. The graft polymerization can be carried out in the presence or absence of inert solvents or inert diluents. Since the polymerization in the absence of inert solvents or diluents generally leads to nonuniform polymers, the polymerization in an inert solvent or diluent is preferred. Examples of suitable inert diluents are those in which the compounds stated under (B) can be suspended and which dissolve the monomers (a). In these cases, the polymers are present in suspended form after the copolymerization and can readily be isolated in solid form by filtration. Suitable inert diluents are, for example, toluene, m- and p-xylene and isomer mixtures, ethylbenzene, aliphatic hydrocarbons, such as pentane, hexane, heptane, octane, nonane, dodecane, cyclohexane, cyclooctane and methylcyclohexane, and mixtures of the stated hydrocarbons or gasoline fractions which contain no polymerizable monomers. Chlorohydrocarbons, such as chloroform, carbon tetrachloride, hexachloroethane, dichloroethane and tetrachloroethane, are also suitable. In the procedure described above, in which the compounds of component (B) are suspended in an inert diluent, anhydrous compounds of component (B) are preferably used.

A preferred method for the preparation of the polymers is solution polymerization, the compounds of component (B), the monomers (A) and the polymer formed being present in at least dispersed form but preferably in dissolved form. For example, inert solvents, such as methanol, ethanol, isopropanol, n-propanol, n-butanol, sec-butanol, tetrahydrofuran, dioxane, water and mixtures of the stated inert solvents, are suitable for the solution polymerization. The polymerization can be carried out continuously or batchwise.

The graft polymers are generally prepared in the presence of free radical initiators.

Preferred free radical initiators are all those compounds which have a half life of less than 3 hours at the polymerization temperature chosen in each case. If the polymerization is first initiated at a lower temperature and is completed at a higher temperature, it is advantageous to use at least two initiators which decompose at different temperatures, ie. first to use an initiator which decomposes at a lower temperature for initiating the polymerization and then to complete the main polymerization with an initiator which decomposes at a higher temperature. Water-soluble and water-insoluble initiators or mixtures of water-soluble and water-insoluble initiators may be used. The water-insoluble initiators are then soluble in the organic phase. For the temperature ranges stated below, for example, the initiators stated for said ranges can be used.

Temperature: from 40 to 60° C.

Acetylcyclohexanesulfonyl peroxide, diacetyl peroxydicarbonate, dicyclohexyl peroxydicarbonate, di-2- ethylhexyl peroxydicarbonate, tert-butyl perneodecanoate, 2,2'-azobis(4-methoxy-2,4-dimethylvaleronitrile), 2,2'-azobis(2-methyl-N-phenylpropionamidine) dihydrochloride, 2,2'-azobis(2-methylpropionamidine) dihydrochloride.

Temperature: from 60 to 80° C.

tert-Butyl perpivalate, dioctanoyl peroxide, dilauroyl peroxide, 2,2'-azobis(2,4-dimethylvaleronitrile).

Temperature: from 80 to 100° C.

Dibenzoyl peroxide, tert-butyl per-2-ethylhexanoate, tert-butyl permaleate, 2,2'-azobisisobutyronitrile, dimethyl 2,2'-azobisisobutyrate, sodium persulfate, potassium persulfate, ammonium persulfate.

Temperature: from 100 to 120° C.

Bis(tert-butylperoxy)cyclohexane, tert-butyl peroxyisopropylcarbonate, tert-butyl peracetate, hydrogen peroxide.

Temperature: from 120 to 140° C.

2,2-Bis(tert-butylperoxy)butane, dicumyl peroxide, di-tert-amyl peroxide, di-tert-butyl peroxide.

Temperature: >140° C.

Menthane hydroperoxide, pinane hydroperoxide, cumyl hydroperoxide and tert-butyl hydroperoxide.

If salts or complexes of heavy metals, for exmaple copper, cobalt, manganese, iron, vanadium, nickel and chromium salts, or organic compounds such as benzoin, dimethylaniline or ascorbic acid, are used in addition to the stated initiators, the half-lives of the stated free radical initiators can be reduced. For example, tert-butyl hydroperoxide can be activated with the addition of 5 ppm of copper(II) acetylacetonate so that polymerization can be effected at as low as 100° C. The reducing component of redox catalysts may also be, for example, compounds such as sodium sulfite, sodium bisulfite, sodium formaldehyde sulfoxylate and hydrazine. From 0.01 to 20, preferably from 0.05 to 10, % by weight, based on the monomers used in the polymerization, of a polymerization initiator or of a mixture of a plurality of polymerization initiators are used. From 0.01 to 15% of the reducing compounds are added as redox components. Heavy metals are used in an amount of from 0.1 to 100 ppm, preferably from 0.5 to 10 ppm. It is often advantageous to use a combination of peroxide, reducing agent and heavy metal as the redox catalyst.

The graft polymerization of the essential monomers (a) and, if required, (b) and of the monomers (c) which may be present if required can also be carried out by the action of ultraviolet radiation, in the presence or absence of UV initiators. The photoinitiators or sensitizers usually used for this purpose are employed for the polymerization under the action of UV radiation. These are, for example, compounds such as benzoin and benzoin ethers, α-methylbenzoin or α-phenylbenzoin. Triplet sensitizers, such as benzil diketals, may also be used. The UV radiation sources used are, for example, high-energy UV lamps, such as carbon arc lamps, mercury vapor lamps or xenon lamps, as well as low-UV light sources, such as fluorescent tubes having a large blue component.

In order to prepare polymers having a low K value, the polymerization is advantageously carried out in the presence of regulators. Examples of suitable regulators are organic compounds containing sulfur in bonded form. These include, for example, mercapto compounds, such as mercaptoethanol, mercaptopropanol, mercaptobutanol, mercaptoacetic acid, mercaptopropionic acid, butyl mercaptan and dodecyl mercaptan. Other suitable regulators are allyl compounds, such as allyl alcohol, aldehydes, such as formaldehyde, acetaldehyde, propionaldehyde, n-butyraldehyde and isobutyraldehyde, formic acid, ammonium formate, propionic acid, hydrazine sulfate and butenols. If the polymerization is carried out in the presence of regulators, from 0.05 to 20% by weight, based on the monomers used in the polymerization, of said regulators are required.

The graft polymerization of components (A) and (B) is usually carried out in an inert atmosphere in the absence of atmospheric oxygen. During the polymerization, thorough mixing of the reactants is generally ensured. In the case of relatively small batches in which reliable removal of the heat of polymerization is ensured, the reactants, which are preferably present in an inert diluent, can be copolymerized batchwise by heating the reaction mixture to the polymerization temperature and then allowing the reaction to take place. These temperatures are from 40 to 180° C. To permit better control of the course of the polymerization reaction, the monomers (A) are added, at the desired polymerization temperature, continuously or batchwise to the polymerizing mixture at a rate such that the polymerization is readily controllable in the desired temperature range. In a preferred method for adding the monomers of component (A), the compounds of component (B) or at least a part of the compounds of component (B) are or is initially taken in the polymerization reactor and heated to the desired polymerization temperature therein while stirring. As soon as this temperature is reached, the monomers (a) and, if required, (b) and, if required, (c) and the initiator and, if required, a regulator are added over a period of from about 1 to 10, preferably from 2 to 8, hours. Such a procedure is used, for example, in the polymerization of components (A) and (B) in an inert diluent in which component (B) is suspended, and also in the polymerization carried out in solution.

The novel graft polymers are preferably prepared by suspension or solution polymerization of components (A) and (B) in an aqueous medium, solution polymerization in water being particularly preferred. In the solution polymerization in an aqueous medium, for example, at least a part of the compounds of component (B) is initially taken in the aqueous medium and the monomers (a) and, if required, (b) and, if required, the monomers (c) are added continuously or batchwise to the polymerizing reaction mixture. In order to avoid hydrolysis of the monomeric N-vinylcarboxamides during the polymerization in aqueous solution, the polymerization is preferably carried out at a pH of from 4 to 9, in particular from 5 to 8. In many cases, it is advisable additionally to work in the presence of buffers, for example to add primary or secondary sodium phosphate to the aqueous phase. When monomers (b) containing acid groups are used, they are preferably employed in the form of the salts.

The weight ratio (A):(B) is from 95:5 to 10:90. 90).

In the graft polymerization, from 1 to 5 parts by weight of component (A) are preferably used per part by weight of component (B).

In the graft polymerization, the temperatures are usually from 40 to 180° C., preferably from 50 to 150° C., in particular from 60 to 110° C. As soon as the temperature in the graft polymerization is above the boiling points of the inert diluents or solvents or of the monomers, the polymerization is carried out under superatmospheric pressure. The concentration of components (A) and (B) in the graft polymerization in the presence of inert solvents or inert diluents is from 10 to 80, preferably from 20 to 70, % by weight. The preparation of the graft polymers can be carried out in the conventional polymerization apparatuses. For example, stirred kettles which are equipped with an anchor stirrer, paddle stirrer, impeller or multistage impulse countercurrent agitator are used for this purpose. Particularly in the polymerization in the absence of diluents, it may be advantageous to carry out the polymerization in a kneader. It may also be necessary to effect polymerization in a kneader if high concentrations are used.

Graft polymers which, where they are soluble in water, have K values of from 8 to 250, preferably from 10 to 150 (measured in 1% strength aqueous solutions of the copolymers at pH 7 and 25° C.) are obtained. The graft polymers which can be prepared by the abovementioned processes are colorless to brownish products. In the case of polymerization in an aqueous medium, they are obtained in the form of dispersions or polymer solutions. Depending on the particular composition of the graft polymers, low-viscosity to pasty aqueous solutions or aqueous dispersions are obtained.

The preparation of the graft polymers may be followed by a second process stage in which hydrolysis is carried out under the action of acids, bases or enzymes. In the hydrolysis, the group

is eliminated from the monomers of the formula I which are present as polymerized units in the graft polymer. The resulting hydroyzed graft polymers contain, in the grafted-on side chain, units of the formulae

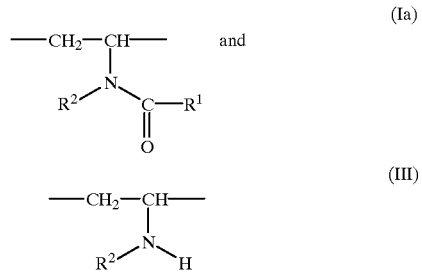

where $R^1$ and $R^2$ have the meanings stated in the formula I. In the hydrolysis of the graft polymers, some or all of any vinyl ester units contained in the grafting base (B) may be hydrolyzed to vinyl alcohol units. In a hydrolysis of the graft polymers in the presence of acids, the units of the formula III are present in the form of the salts, while in the hydrolysis in the presence of bases the free amino groups are present, depending on the pH.

Depending on the reaction conditions in the hydrolysis, ie. the amount of acid or base, based on the polymer to be hydrolyzed, and on the reaction temperature during the hydrolysis, either partial or complete hydrolysis of the units of the formula Ia results. The hydrolysis of the graft polymers is continued until from 1 to 100%, preferably from 30 to 95%, of the monomer units of the formula (II) which are contained in the graft polymers have been hydrolyzed. For the hydrolysis, at least one acid or base is added to the graft polymers prepared in the first process stage. Suitable acids are, for example, mineral acids, such as hydrogen halide, (in gaseous form or in aqueous solution), sulfuric acid, nitric acid or phosphoric acid (ortho-, meta- or polyphosphoric acid), and organic acids, for example $C_1$–$C_5$-carboxylic acids, such as formic acid, acetic acid and propionic acid, or the aliphatic or aromatic sulfonic acids, such as methane-sulfonic acid, benzenesulfonic acid or toluenesulfonic acid. Hydrochloric acid or sulfuric acid is preferably used for the hydrolysis. In the hydrolysis with acids, the pH is from 0 to 5. For example, from 0.05 to 1.5, preferably from 0.4 to 1.2, equivalents of acid are required per formyl group equivalent in the polymer.

In the hydrolysis with bases, hydroxides of metals of the first and second main groups of the Periodic Table may be used; for example, lithium hydroxide, sodium hydroxide, potassium hydroxide, calcium hydroxide, strontium hydroxide and barium hydroxide are suitable. However, it is also possible to use ammonia and alkyl derivatives of ammonia, for example alkylamines or arylamines, eg. triethylamine, monoethanolamine, diethanolamine, triethanolamine, morpholine or aniline. In the hydrolysis with bases, the pH is from 8 to 14. The bases can be used in the solid, liquid or, if required, also gaseous state, diluted or undiluted. A preferably used base for the hydrolysis is ammonia, sodium hydroxide solution or potassium hydroxide solution. The hydrolysis at acidic or alkaline pH is carried out, for example, at from 30 to 170° C., preferably from 50 to 120° C. It is complete after from about 2 to 8, preferably from 3 to 5, hours. After this reaction time, from 1 to 100% of the polymerized monomers of the formula I have been hydrolyzed. A procedure in which the bases or acids are added in aqueous solution for the hydrolysis has proven particularly useful. After the hydrolysis, a neutralization is generally carried out, so that the pH of the hydrolyzed polymer solution is from 2 to 8, preferably from 3 to 7. The neutralization is required when it is intended to prevent or delay a continuation of the hydrolysis of partially hydrolyzed polymers. The hydrolysis can also be carried out with the aid of enzymes.

Particularly preferred graft polymers are those which have been prepared using N-vinylformamide or monomer mixtures of (a) from 1 to 99% by weight of N-vinylformamide and (b) from 99 to 1% by weight of vinyl formate and/or vinyl acetate as monomer (A) and polyvinyl alcohols which may be esterified to a degree of upto 25 mol % with saturated $C_1$–$C_4$-carboxylic acids as polymer (B) and which are then subjected to hydrolysis in which from 1 to 100% of the formyl groups of the grafted-on N-vinylformamide are eliminated from the graft polymer with formation of units of the formula

and from 2 to 100% of the formate and/or acetate groups of the rafted-on vinyl formate and/or vinyl acetate are eliminated with formation of units of the formula

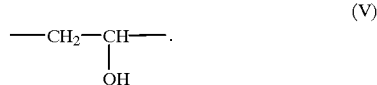

In the acidic hydrolysis of graft polymers which contain not only N-vinylformamide but also acrylonitrile as polymerized units, acrylamide units and/or acrylic acid units and imide structures of the formula

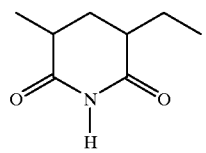
(VI)

may also be formed from the last-mentioned monomer. The proportion of these structures in the hydrolyzed graft polymer may be from 0 to 60 mol % of the units (VI), depending on the amount of polymerized acrylonitrile and on the reaction conditions. On the other hand, the hydrolysis with bases, in particular metal hydroxides, leads to substantial formation of carboxylate functions.

The K values of the hydrolyzed graft polymers are from 8 to 250, preferably from 10 to 150 (measured in 1% strength aqueous solutions of the polymers at pH 7 and 25° C.), where the polymers are soluble in water.

To prevent or substantially suppress a decrease in the efficiency of the hydrolyzed graft polymers during use, as a result of storage, and to obtain a substantially color-stable polymer solution, antioxidants, reducing agents or aldehyde scavengers may be added during or after the hydrolysis.

Antioxidants, which generally act as free radical scavengers or UV stabilizers, are, for example, secondary aromatic amines, phenol, alkylphenols, thioethers, phosphites or mixtures of compounds of the stated classes. Suitable secondary aromatic amines are, for example, 4,4'-bis(tert-butyl) diphenylamine, 4,4'-bis(phenylmethyl)diphenylamine or mixtures thereof. Alkylphenols which are suitable antioxidants are, for example 2,6-dimethyl-4-tert-butylphenol, 2,4, 6-trimethylphenol, 2,4-di-tert-butyl-6-methylphenol or mixtures thereof. Examples of suitable thioethers are dialkyl 3,3'-thiodipropionate, poly-2,3-dimethylphenyl 1,4-disulfide, bis(2-methyl-4-hydroxy-5-tert-butyl) sulfide, dibenzyl sulfide and dialkyl disulfides, eg. dioctadecyl disulfide.

Phosphites which are suitable antioxidants are, for example, trisnonylphenyl phosphite, di(2,4-di-tert-butylphenyl) pentaerythrityl diphosphite and diphenylene decyl phosphite.

Examples of suitable reducing agents are sodium borohydride, sodium cyanoborohydride and dithionites, such as sodium, potassium or zinc dithionite.

Aldehyde scavengers are, for example, NH-containing compounds, such as urea, ethyleneurea, propyleneurea, melamine, guanidine, phenylbiguanidine or mixtures of the stated compounds. Other aldehyde scavengers are, for example, alkali metal bisulfites, such as sodium or potassium bisulfite.

Antioxidants, reducing agents and aldehyde scavengers are each used in amounts of from 0.01 to 20, preferably from 0.1 to 16, % by weight, based on the polymers. These substances may be added before, during or after the hydrolysis of the amido groups contained in the graft polymers.

The graft polymers obtained in this manner and containing N-vinylcarboxamide and/or vinylamine units are used in papermaking for increasing the dry and wet strength of the paper. The novel graft polymers, which may be hydrolyzed, are preferably used in aqueous solution and are added to the paper stock before sheet formation, in an amount of from 0.1 to 10% by weight, based on dry fibers. The aqueous polymer solutions may also be applied to the surface of the paper, the amounts to be used being from 0.1 to 10, preferably from 0.25 to 3, % by weight, based on dry fibers. The aqueous solutions of the polymers are effective in the case of all known paper, board and cardboard qualities, for example in the production of hygiene, writing, printing and packaging papers. The papers or boards and cardboards may be produced from a large number of fiber materials, for example from sulfite or sulfate pulp (bleached or unbleached), groundwood pulp, chemothermomechanical pump (CTMP), thermomechanical pulp (TMP) or wastepaper or mixtures of the stated fiber types. The pH of the stock suspension is from 4 to 9, preferably from 6 to 8. The copolymers described above are preferably added in an amount of from 0.25 to 2% by weight, based on dry fibers, to the paper stock suspension before sheet formation and lead to an increase in the dry and wet strength of the paper.

The graft polymers, which may be hydrolyzed, are also suitable as fixing agents for interfering substances and dyes in the production of paper, board and cardboard. For this intended use, the graft polymers are added directly to the paper stock or may be added to the paper stock in the form of a mixture with the resin size. For example, from 1 to 100, preferably from 5 to 30, parts by weight, based on 100 parts by weight of resin size, of the graft polymers are used.

Graft polymers which have a high molecular weight, for example K values of from about 150 to 250, are used as retention aids and drainage aids in the production of paper, board and cardboard. Usually, from 0.01 to 5, preferably from 0.1 to 2, % by weight, based on dry fibers, of graft polymers are suitable for this intended use.

A further application of the novel graft polymers, in particular of hydrolyzed graft polymers, is as starch cationization agents. In order to cationize starch, for example, an aqueous suspension of starch is heated to 80–180° C. in the presence of the graft polymers. At temperatures above the boiling point of the aqueous reaction mixtures, closed pressure-resistant apparatuses are used. For example, from 0.1 to 100, preferably from 1 to 10, % by weight, based on starch, of at least one graft polymer are used in the starch cationization. All starch types can be cationized with the novel graft polymers, for example natural starches, such as potato, rice, corn and wheat starches, as well as degraded starches or starch types having amylopectin contents of from at least 95 to 100%, for example wax corn starches or wax potato starches. Those graft polymers in which the degree of hydrolysis of the polymerized N-vinylcarboxamides is at least 60% are particularly suitable for this intended use. The cationized starches thus prepared are used, for example, in papermaking. The result is an increase in the dry and wet strength of the paper and are distinguished by particularly high retention compared with unmodified starches.

The novel graft polymers may also be used as dispersants for pigments. The amounts usually used for this purpose are from about 0.1 to 5, preferably from 0.5 to 2, % by weight, based on the pigments. Suitable pigments are, for example, chalk, clay, talc and titanium dioxide. Highly concentrated aqueous pigment suspensions are prepared for use as fillers in appermaking or for the preparation of paper coating slips. Such pigment suspensions may contain up to 75% by weight of a pigment.

The novel graft polymers are furthermore suitable as promoters in the diketene sizing of paper, board and cardboard. The graft polymers are emulsified together with the diketene in water in the preparation of the diketene emulsion for this purpose. The diketene emulsions contain, for example, from 0.05 to 5% by weight of a graft polymer. The novel graft polymers result in rapid formation of the diketene size. The graft polymers are furthermore suitable as creping assistants in the production of tissue papers. They are used for this purpose in amounts of from 0.05 to 5% by weight, based on dry fibers.

In the examples which follow, parts and percentages are by weight.

The K values of the polymers were determined according to H. Fikentscher, Cellulose-Chemie, 13 (1932), 58–64 and 71–74, in 1% strength by weight aqueous solution at 25° C.

The paper sheets are produced in a Rapid-Köthen laboratory sheet former. The dry breaking length was determined according to DIN 53112, sheet 1, and the wet breaking length according to DIN 53112, sheet 2.

EXAMPLE 1

829.5 g of distilled water, 1.27 g of 75% strength phosphoric acid and 0.87 g of 50% strength aqueous sodium hydroxide solution and 33 g of polyvinyl alcohol containing 2 mol % of acetate groups and having a molecular weight of 27,000 are introduced into a heatable reactor equipped with a stirrer, a reflux condenser, a thermometer, feed apparatuses and nitrogen inlet and outlet apparatuses, and the pH of the mixture is brought to 6.5 with phosphoric acid or sodium hydroxide solution. The reactor content is then heated to 70° C. in a gentle stream of nitrogen (10 l/h), and 134.7 g of N-vinylformamide are metered in uniformly in the course of 3 hours and a solution of 0.53 g of 2,2'-azobis(2-methylpropionamidine) dihydrochloride in 100 g of distilled water is metered in uniformly in the course of 4 hours. Heating is then continued for a further 2 hours at 70° C. The slightly cloudy, colorless, viscous solution has a solids content of 16.1% and a K value of 81.
Hydrolysis:

500 g of the graft polymer solution described above are initially taken in a stirred apparatus equipped with a reflux condenser, a thermometer and a dropping funnel. 103 g of 38% strength hydrochloric acid are added dropwise in the course of 15 minutes with thorough stirring. The reaction mixture is then heated at 70° C. for 6 hours. The conversion is determined by polyelectrolyte titration. After the mixture has cooled to room temperature, a pH of 3.8 is established by slow dropwise addition of a total of 77.6 g of 50% strength aqueous sodium hydroxide solution. 11 g of 30% strength sodium bisulfite solution are added to the solution and stirring is continued for 10 minutes. The degree of hydrolysis of the polymerized N-vinylformamide is 91%, the solids content 21.8%, the polymer content 12.2% and the K value 80.5.

EXAMPLE 2

831 g of distilled water, 0.96 g of aqueous 75% strength phosphoric acid, 0.66 g of 50% strength aqueous sodium hydroxide solution and 66 g of polyvinyl alcohol containing 2 mol % of acetate groups and having a molecular weight of 27,000 are introduced into a reactor according to Example 1, and the mixture is brought to a pH of 6.5 as in Example 1. The mixture is then heated to 70° C. in a gentle stream of nitrogen (10 l/h), and 101 g of N-vinylformamide are metered in uniformly in the course of 3 hours and a solution of 0.4 g of 2,2'-azobis(2-methylpropionanidine) dihydrochloride in 100 g of distilled water is metered in uniformly in the course of 4 hours at 70° C. Heating is then continued for a further 2 hours at 70° C. The cloudy, colorless solution has a solids content of 14.9%. The K value of the graft polymer is 72.8.
Hydrolysis:

500 g of the graft polymer solution described above are initially taken in a stirred apparatus equipped with a reflux condenser, a thermometer and a dropping funnel. 74.8 g of 38% strength hydrochloric acid are added dropwise in the course of 10 minutes 30 with thorough stirring. The solution is then heated at 70° C. for 6 hours. The conversion is determined by polyelectrolyte titration. After the mixture has cooled to room temperature, a pH of 3.8 is established by adding 56 g of 50% strength aqueous sodium hydroxide solution a little at a time. 10.6 g of 30% strength sodium bisulfite solution are added, and stirring is continued for a further 10 minutes. 641.4 g of an aqueous solution of a hydrolyzed graft polymer are obtained. The degree of hydrolysis of the polymerized N-vinylformamide is 85%. The solution has a solids content of 20% and a polymer content of 12.5%. The K value of the hydrolyzed graft polymer is 73.

EXAMPLE 3

Example 2 is repeated, with the exceptions that the amount of polyvinyl alcohol is increased to 99 g and 67.3 g of N-vinylformamide are metered in over 3 hours. The cloudy, colorless solution has a solids content of 14.3%. The K value of the graft polymer is 62.9.
Hydrolysis:

As stated in Example 2, 500 g of the graft polymer solution described above are hydrolyzed with 47 g of 38% strength hydrochloric acid. 35 g of 50% strength sodium hydroxide solution and 9.7 g of 30% strength sodium bisulfite solution are then added. The degree of hydrolysis of the polymerized N-vinylformamide is 79%. The slightly cloudy solution has a solids content of 17.6% and a polymer content of 12.6%. The K value of the hydrolyzed graft polymer corresponds to the K value of the unhydrolyzed graft polymer.

EXAMPLE 4

Example 1 is repeated, with the single exception that, instead of the polymer used there, a polyvinyl alcohol which contains 2 mol % of acetate groups and has a molecular weight of 61,000 is now used. A cloudy, colorless solution having a solids content of 15.3% is obtained. The K value of the polymer is 23.1.
Hydrolysis:

As described in Example 1, 500 g of the graft polymer solution described above are hydrolyzed with 102 g of 38% strength hydrochloric acid. 69.1 g of 50% strength aqueous sodium hydroxide solution and 11 g of 30% strength sodium bisulfite solution are then added. The degree of hydrolysis of the polymerized N-vinylformamide units is 94%. The solution has a solids content of 21.1% and a polymer content of 12.3%. The K value of the hydrolyzed graft polymer is 22.8.

EXAMPLE 5

The procedure is as described in Example 1, except that the grafting base used is a polyvinyl alcohol which contains 12 mol % of acetate groups and has a molecular weight of 130,000. A cloudy, colorless solution having a solids content of 15.3% is obtained. The graft polymer has a K value of 81.
Hydrolysis:

500 g of the aqueous polymer solution described above are hydrolyzed, as described in Example 1, by adding 102 g of 38% strength hydrochloric acid. After the reaction mixture has cooled, 69.9 g of 50% strength aqueous sodium hydroxide solution are added for adjusting the pH, and 11 g of a 30% strength aqueous sodium bisulfite solution are added. The solution thus obtained has a solids content of 21.7% and contains 12.1% of polymer. The degree of hydrolysis of the polymerized N-vinylformamide is 91%. The hydrolyzed graft polymer has virtually the same K value as the unhydrolyzed polymer.

EXAMPLE 6

395 g of distilled water, 2.62 g of 75% strength aqueous phosphoric acid, 1.8 g of 50% strength aqueous sodium hydroxide solution, 1.44 g of an aqueous solution of the sodium salt of a molar copolymer of maleic acid and styrene, having a molecular weight of 150,000, and 75.6 g of the polyvinyl alcohol described in Example 1 are initially taken in the reactor described in Example 1 and brought to a pH of 6.5. The mixture is then heated to 65° C. in a gentle stream of nitrogen while stirring, and, at this temperature, 34 g of vinyl acetate are added uniformly in the course of 2 hours, 81 g of N-vinylformamide are added uniformly and separately therefrom in the course of 3 hours and a solution of 0.25 g of 2,2'-azobis(2-methylpropionamidine) dihydrochloride is added uniformly in the course of 4 hours, likewise separately therefrom. During the polymerization, the reaction mixture is highly viscous. It is therefore diluted with 300 g of distilled water. After the addition of the initiator, the reaction mixture is stirred for a further 2 hours at 65° C., after which a solution of 0.05% of 2,2'-azobis(2-methylpropionamidine) dihydrochloride in 1 g of distilled water is added all at once. The temperature of the reaction mixture is then increased to 98° C. in the course of 4 hours and the reaction solution is then cooled. A clear, colorless solution having a solids content of 17% is obtained. The polymer has a K value of 76.2.

Hydrolysis:

500 g of the polymer solution described above are hydrolyzed by the method stated in Example 1, by adding 65.4 g of 38% strength hydrochloric acid. After the hydrolysis, 45.2 g of a 50% strength aqueous sodium hydroxide solution and 7.5 g of a 30% strength aqueous sodium bisulfite solution are added. The reaction mixture has a solids content of 22% and a polymer content of 15.5%. The degree of hydrolysis of the polymerized N-vinylformamide is 95% and that of the polymerized vinyl acetate is 35%. The hydrolyzed graft polymer has virtually the same K value as the graft polymer before the hydrolysis.

EXAMPLE 7

829 g of distilled water, 1.27 g of 75% strength aqueous phosphoric acid, 0.87 g of 50% strength aqueous sodium hydroxide solution and 66 g of polyvinyl alcohol described in Example 1 are initially taken in the reactor described in Example 1, brought to a pH of 6.7 and heated to 70° C. under a gentle stream of nitrogen and while stirring. As soon as the reactor content has reached this temperature, a mixture of 50.5 g of N-vinylformamide and 49.5 g of acrylonitrile is metered in uniformly in the course of 2 hours and, separately therefrom, a solution of 0.4 g of 2,2'-azobis(2-methylpropionamidine) dihydrochloride in 100 g of distilled water is metered in uniformly in the course of 4 hours. A fine, white 13.7% strength polymer suspension is obtained.

Hydrolysis:

500 g of the polymer suspension described above are initially taken in an apparatus equipped with a stirrer, and 42.4 g of 38% strength hydrochloric acid are added in the course of 10 minutes. The suspension is stirred for 8 hours at 70° C. Thereafter, the reaction mixture is allowed to cool, the viscous solution is diluted with 140 g of water and a pH of 2.5 is established by adding 34.0 g of 25% strength aqueous sodium hydroxide solution. 11.7 g of a 30% strength aqueous sodium bisulfite solution are then also added, and the reaction mixture is stirred for a further 15 minutes. It has a solids content of 10.8% and a polymer content of 6.9%. The degree of hydrolysis of the polymerized N-vinylformamide is 90%. The K value of the hydrolyzed graft polymer corresponds to that of the unhydrolyzed polymer.

EXAMPLE 8

829 g of distilled water, 1.27 g of 75% strength aqueous phosphoric acid, 0.87 g of 50% strength aqueous sodium hydroxide solution and 66 g of the polyvinyl alcohol described in Example 1 are initially taken in the reactor described in Example 1, brought to a pH of 7.3 and heated to 70° C. under a gentle stream of nitrogen and while stirring. As soon as the reactor content has reached this temperature, 80.8 g of N-vinylformamide and 19.8 g of N-vinylpyrrolidone are each metered in uniformly in the course of 2 hours and, separately therefrom, a solution of 0.4 g of 2,2'-azobis(2-methylpropionamidine) dihydrochloride in 100 g of distilled water is metered in uniformly in the course of 4 hours. A cloudy, colorless 15.3% strength solution is obtained. The graft polymer has a K value of 77.6.

Hydrolysis:

As described in Example 1, 500 g of the graft polymer solution described above are hydrolyzed with 70.5 g of 33% strength hydrochloric acid, after which 54.8 g of 25% strength sodium hydroxide solution and 10.1 g of 30% strength sodium sulfite solution are added. The pH of the product is 2.5 and the degree of hydrolysis of the polymerized N-vinylformamide units is 100%.

The solution has a solids content of 17% and a polymer content of 12.7%. The K value of the hydrolyzed graft polymer corresponds to the K value of the unhydrolyzed polymer.

EXAMPLE 9

729 g of distilled water, 1.27 g of 75% strength aqueous phosphoric acid, 0.87 g of 50% strength aqueous sodium hydroxide solution and 66 g of the polyvinyl alcohol described in Example 1 are initially taken in the reactor described in Example 1, brought to a pH of 6.5 and heated to 70° C. under a gentle stream of nitrogen and while stirring. As soon as the reactor content has reached this temperature, 70.7 g of N-vinylformamide and 160 g of an aqueous acrylic acid solution brought to pH 7.3 with NaOH (29.7 g of acrylic acid) are each metered in uniformly in the course of 2 hours and, separately therefrom, a solution of 0.4 g of 2,2'-azobis(2-methylpropionamidine) dihydrochloride in 100 g of distilled water is metered in uniformly in the course of 4 hours. A cloudy, colorless 15.5% strength solution is obtained. The graft polymer has a K value of 77.6.

Hydrolysis:

As described in Example 1, 500 g of the graft polymer solution described above are hydrolyzed with 72.5 g of 38% strength hydrochloric acid. 38.7 g of 50% strength aqueous sodium hydroxide solution and 12 g of 30% strength sodium bisulfite solution are then added. The pH of the solution is 2.5 and the degree of hydrolysis of the polymerized vinylformamide units is 95%. The solution has a solids content of 18% and a polymer content of 12.4%. The K value of the hydrolyzed graft polymer is 77.

COMPARATIVE EXAMPLE 1

74 g of 38% strength hydrochloric acid (120 mol %, based on N-vinylformamide) are added dropwise to 300 g of a 15.3% strength aqueous polyvinylformamide solution (K value of the polymer is 85). The mixture is then heated at 70° C. for about 5 hours. The degree of hydrolysis (>93%) is monitored by polyelectrolyte titration. After cooling, the pH of the solution is increased to 3.5 with 50% strength sodium hydroxide solution (40.6 g). The polymer content of the solution is 10.9% by weight.

COMPARATIVE EXAMPLE 2

A copolymer of 70% by weight of N-vinylformamide and 30% by weight of vinyl acetate, having a K value of 85, is prepared according to U.S. Pat. 4,978,427 and is hydrolyzed by adding 110 mol % of a 38% strength hydrochloric acid per mole of N-vinylformamide contained in the polymer, to such an extent that at least 90% of the polymerized N-vinylformamide and at least 80% of the polymerized vinyl acetate are hydrolyzed.

COMPARATIVE EXAMPLE 3

Commercial neutral wet strength resin based on a urea/formaldehyde condensate

Use Examples

EXAMPLE 10

Sheets having a basis weight of 80 g/m² were produced in a Rapid-Köthen sheet former. The paper stock consisted of 50% of bleached hardwood sulfite pulp and 50% of bleached softwood sulfite pulp having a freeness of 32°SR (Schopper-Riegler) in 0.5% strength aqueous suspension. The pH of the stock suspension was 7.0. The stock suspension was divided into 8 equal parts. The substances stated under (b) to (h) were added to 7 samples:

(a) The stock suspension contained no further additives.
(b) 1%, based on dry fibers, of a commercial resin according to comparative product 3 was added to the stock suspension.
(c) 1%, based on dry fibers, of the hydrolyzed polyvinylformamide according to Comparative Example 1 was added to the stock suspension.
(d–h) 1%, based on dry fibers, of the hydrolyzed graft polymer prepared according to Examples 1 to 5 was added to the stock suspension (Examples according to the invention).

The paper stock suspensions (a) to (h) described above were then converted into the sheets (a) to (h) on a Rapid-Köthen sheet former. The wet breaking length and the dry breaking length of the sheets obtained were determined. The results are shown in Table 1.

TABLE 1

| Example 10 | Graft polymer according to Example | Wet breaking length [m] unaged | Wet breaking length [m] aged (5 min at 110° C.) | Dry breaking length [m] unaged |
|---|---|---|---|---|
| a) | none | 116 | 122 | 3302 |
| b) | Comparison 3 | 799 | 821 | 3541 |
| c) | Comparison 2 | 808 | 815 | 4065 |
| d) | 1 | 774 | 816 | 3953 |
| e) | 2 | 701 | 799 | 4087 |
| f) | 3 | 781 | 699 | 3758 |
| g) | 4 | 821 | 839 | 3892 |
| h | 5 | 806 | 869 | 3953 |

EXAMPLE 11

Sheets having a basis weight of 80 g/m² were produced in a Rapid-Köthen sheet former. The paper stock consisted of 50% of bleached hardwood sulfite pulp and 50% of bleached softwood sulfite pulp having a freeness of 32°SR (Schopper-Riegler) in 0.5% strength aqueous suspension. The pH of the stock suspension was 4.5. The stock suspension was divided into 8 equal parts. The substances stated under (b) to (h) were added to 7 samples:

(a) The stock suspension contained no further additives.
(b) 1%, based on dry fibers, of the commercial product according to comparative example 3 was added to the stock suspension.
(c) 1%, based on dry fibers, of the product according to comparative example 2 was added to the stock suspension.
(d–h) 1%, based on dry fibers, of the hydrolyzed graft polymer prepared according to Examples 1 to 5 was added to the stock suspension (Examples according to the invention).

The paper stock suspensions (a) to (h) described above were converted into paper sheets, and the wet breaking length and the dry breaking length were determined. The results are shown in Table 2.

TABLE 2

| Example 11 | Graft polymer according to Example | Wet breaking length [m] unaged | Wet breaking length [m] aged (5 min at 110° C.) | Dry breaking length [m] unaged |
|---|---|---|---|---|
| a) | none | 150 | 170 | 3309 |
| b) | Comparison 3 | 631 | 799 | 4013 |
| c) | Comparison 2 | 822 | 1003 | 4389 |
| d) | 1 | 807 | 927 | 4823 |
| e) | 2 | 771 | 837 | 4477 |
| f) | 3 | 699 | 737 | 5122 |
| g) | 4 | 819 | 910 | 4721 |
| h) | 5 | 716 | 813 | |

We claim:

1. A graft polymer of a polymer containing vinyl ester or vinyl alcohol units and an ethylenically unsaturated compound, which graft polymer is obtainable by free radical polymerization of (A) monomers or monomer mixtures comprising
  (a) from 1 to 100% by weight of N-vinylformamide,
  (b) from 0 to 99% by weight of other monoethylenically unsaturated monomers copolymerizable with the monomers (a) and
  (c) from 0 to 5% by weight of monomers having at least two ethylenically unsaturated, nonconjugated double bonds in the molecule, in the presence of (B) polymers which contain units of vinyl esters of saturated $C_1$–$C_4$-carboxylic acids or vinyl alcohol units, or of mixtures which contain these polymers and polymers having at least 3 alkylene oxide units or polytetrahydrofuran, in a weight ratio (A):(B) of from 95:5 to 10:90 and subsequent elimination of from 1 to 100% of the formyl groups of the grafted-on N-vinylformamide by hydrolysis with formation of units of the formula

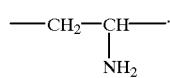

2. A graft polymer as claimed in claim 1, wherein N-vinylformamide is used as monomer (A) and polyvinyl alcohols are used as polymer (B), and from 1 to 100% of the formyl groups of the grafted-on N-vinylformamide are eliminated from the graft polymer by hydrolysis with formation of units of the formula

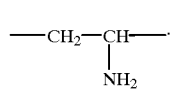

3. A graft polymer as claimed in claim 1, wherein monomer mixtures of
(a) from 1 to 99% by weight of N-vinylformamide and
(b) from 99 to 1% by weight of vinyl formate or vinyl acetate are used as (A) and polyvinyl alcohols are used as polymer (B), and from 1 to 100% of the formyl groups of the grafted-on N-vinylformamide are eliminated from the graft polymer by hydrolysis with formation of units of the formula

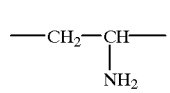

and from 2 to 100% of the formate or acetate groups of the grafted-on vinyl formate or vinyl acetate are eliminated with formation of units of the formula

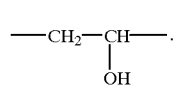

4. A graft polymer as claimed in claim 1, wherein from 30 to 95% of the formyl groups are eliminated from the graft polymer.

5. A graft polymer as claimed in claim 1, wherein from 30 to 95% of the formyl groups are eliminated from the graft polymer and from 30 to 95% of the formate or acetate groups are eliminated from the grafted-on monomers.

6. A process for the preparation of a graft polymer of a polymer containing vinyl ester or vinyl alcohol units and an ethylenically unsaturated compound, comprising grafting by free radical polymerization
(A) monomers or monomer mixtures comprising
  (a) from 1 to 100% by weight of N-vinylformamide,
  (b) from 0 to 99% by weight of other monoethylenically unsaturated monomers copolymerizable with the monomers (a) and
  (c) from 0 to 5% by weight of monomers having at least two ethylenically unsaturated, nonconjugated double bonds in the molecule,
onto
(B) polymers which contain units of vinyl esters of saturated $C_1$–$C_4$-carboxylic acids or vinyl alcohol units, or of mixtures which contain these polymers and polymers having at least 3 alkylene oxide units or polytetrahydrofuran,
in a weight ratio (A):(B) of from 95:5 to 10:90, followed by eliminating by hydrolysis some or all of the formyl groups from the grafted-on N-vinylformamide of the graft polymer with formation of units of the formula

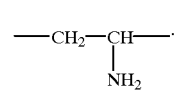

7. A process for the preparation of graft polymers as claimed in claim 6, wherein monomer mixtures of
(a) from 1 to 99% by weight of N-vinylformamide and
(b) from 99 to 1% by weight of vinyl formate or vinyl acetate are used as (A) and polyvinyl alcohols are used as polymer (B), and from 1 to 100% of the formyl groups of the grafted-on N-vinylformamide are eliminated from the graft polymer with formation of units of the formula

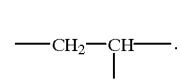

and from 2 to 100% of the formate or acetate groups of the grafted-on vinyl formate or vinyl acetate are eliminated with formation of units of the formula

—CH$_2$—CH—. (V)
      |
      OH

8. The graft polymer as claimed in claim 2, wherein said polyvinyl alcohols are esterified to a degree of up to 25 mol % with saturated $C_1$–$C_4$-carboxylic acids.

9. The graft copolymer as claimed in claim 3, wherein said polyvinyl alcohols are esterified to a degree of up to 25 mol % with saturated $C_1$–$C_4$-carboxylic acids.

10. The process of claim 7, wherein said polyvinyl alcohols are esterified to a degree of up to 25 mol % with $C_1$–$C_4$-carboxylic acids.

* * * * *